United States Patent
Moriwaki et al.

(10) Patent No.: US 7,260,662 B2
(45) Date of Patent: Aug. 21, 2007

(54) I2C BUS CONTROLLING METHOD

(75) Inventors: Shohei Moriwaki, Tokyo (JP); Osamu Chiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 156 days.

(21) Appl. No.: 11/169,655

(22) Filed: Jun. 30, 2005

(65) Prior Publication Data

US 2006/0069831 A1   Mar. 30, 2006

(30) Foreign Application Priority Data

Sep. 29, 2004  (JP) ............................. 2004-284421

(51) Int. Cl.
*G06F 13/00* (2006.01)
*H04L 12/28* (2006.01)

(52) U.S. Cl. ............... 710/107; 710/110; 710/307; 710/8; 710/301; 370/401; 370/463; 340/825; 713/151; 713/300

(58) Field of Classification Search .............. 710/8, 710/110, 119, 107; 370/463, 85–90
See application file for complete search history.

(56) References Cited

U.S. PATENT DOCUMENTS

| | | | | |
|---|---|---|---|---|
| 5,909,559 | A * | 6/1999 | So ........................ | 710/307 |
| 6,263,396 | B1 * | 7/2001 | Cottle et al. ............. | 710/263 |
| 6,338,150 | B1 * | 1/2002 | Johnson et al. ........... | 714/39 |
| 6,369,855 | B1 * | 4/2002 | Chauvel et al. .......... | 348/423.1 |
| 6,442,170 | B1 * | 8/2002 | Perlman et al. .......... | 370/401 |
| 6,751,740 | B1 * | 6/2004 | Robertson et al. ........ | 713/300 |
| 6,816,750 | B1 * | 11/2004 | Klaas ...................... | 700/121 |
| 6,842,806 | B2 * | 1/2005 | Ervin ...................... | 710/110 |
| 6,883,056 | B2 * | 4/2005 | Kobayashi ................ | 710/305 |
| 7,043,569 | B1 * | 5/2006 | Chou et al. ............... | 710/8 |
| 2004/0267999 | A1 * | 12/2004 | Larson et al. ............. | 710/301 |
| 2005/0022815 | A1 * | 2/2005 | Frola ....................... | 128/204.21 |
| 2005/0071628 | A1 * | 3/2005 | Yang et al. ............... | 713/151 |
| 2005/0078969 | A1 * | 4/2005 | Kikuchi ................... | 399/12 |
| 2005/0099413 | A1 * | 5/2005 | Chiu et al. ................ | 345/211 |
| 2005/0228980 | A1 * | 10/2005 | Brokish et al. ........... | 713/2 |
| 2006/0067358 | A1 * | 3/2006 | Moriwaki et al. ......... | 370/463 |
| 2006/0069822 | A1 * | 3/2006 | Moriwaki et al. ......... | 710/71 |
| 2006/0069905 | A1 * | 3/2006 | Moriwaki et al. ......... | 713/1 |
| 2006/0107138 | A1 * | 5/2006 | Moriwaki et al. ......... | 714/724 |

FOREIGN PATENT DOCUMENTS

JP   62-150414   7/1987

OTHER PUBLICATIONS

The I2C Bus Specification Version 2.1—Jan. 2000—pp. 1 and 7.*

* cited by examiner

*Primary Examiner*—Paul R. Myers
*Assistant Examiner*—Brian Misiura
(74) *Attorney, Agent, or Firm*—Leydig, Voit & Mayer, Ltd.

(57) ABSTRACT

A module has an IC for communication control (a PHY unit) and an EEPROM (or MCU) connected to the PHY unit via an I2C bus. When a software reset is triggered while the PHY unit reads non-volatile register (NVR) data from the EEPROM (or MCU) via the I2C bus, the module causes an I2C interface circuit of the PHY unit to forcedly toggle and send a clock signal to the EEPROM (or MCU) via the I2C bus to make the EEPROM (or MCU) recognize that interrupted communications via the I2C bus are pseudo completed.

2 Claims, 3 Drawing Sheets

I2C BUS CONTROLLING METHOD

BACKGROUND OF THE INVENTION

1. Field of the Invention

The present invention relates to an I2C bus controlling method. More particularly, it relates to an I2C bus controlling method for use in modules for optical communications.

2. Description of Related Art

There have been provided, as serial buses for use in optical communication modules, a management data input/output bus (referred to as an MDIO bus from here on) and an inter integrated circuit bus (referred to as an I2C bus from here on). An IC for communication control (referred to as a PHY unit from here on), which can be disposed in optical communication modules, is provided with a non-volatile register (referred to as an NVR register from here on), a register for digital optical monitoring (referred to as a DOM register from here on), and a register for MDIO. While the PHY unit is connected, via an MDIO bus, to a host that controls the PHY unit, it is also connected, via an I2C bus, to a nonvolatile external storage (referred to as an EEPROM from here on), such as an EEPROM, a flash memory, an IC (referred to as an MCU from here on) having an operation function and peripheral functions, or the like.

Conventionally, as an initializing method for use with optical communication modules (referred to as modules from here on), there are two types of RESET: hardware RESET (referred to as HW-RESET from here on) of initializing the PHY unit by sending a RESET signal to each IC of the PHY unit, and software RESET (referred to as SW-RESET from here on) of initializing the PHY unit in response to a RESET command from the host.

When starting the module, the host outputs an HW-RESET signal to the module so as to reset the PHY unit. The PHY unit reads NVR data required for initial setting (referred to as NVR data from here on) from the EEPROM (or MCU) via the I2C bus after being started. The Host needs to carry out SW-RESET by sending a RESET command to the module after carrying out HW-RESET. As a result, the PHY unit is reset again, and the supply of a serial clock signal (referred to an SCL signal from here on) via the I2C bus is stopped.

Communications via the I2C bus are carried out in synchronization with the SCL signal. A serial data signal (referred to as an SDA signal from here on) is also synchronized with the SCL signal. To be more specific, when the SCL signal has a low level, the SDA signal changes, whereas when the SCL signal has a high level, the SDA signal does not change.

When SW-RESET occurs while data at a corresponding address from the EEPROM (or MCU) are piggybacked onto the SDA signal and the data are outputted via the I2C bus, the supply of the SCL signal from the PHY unit via the I2C bus is stopped with the SCL signal being at a high state according to the I2C bus standards, and therefore the SDA signal does not change, either. Although the PHY unit generates an internal signal for resetting itself when SW-RESET is started, the internal signal cannot be applied to the EEPROM (or MCU). As a result, the EEPROM (or MCU) stops while being in a state in which it is using the I2C bus.

There has been provided a common equipment protection circuit having a monitoring circuit for generating an initialization completion signal at the time of completion of initialization of two or more pieces of common equipment which are connected to a system bus, the initialization being carried out at the time of reset of a system, and a processor module locking circuit for generating a signal for disabling a processor module group connected to the above-mentioned system bus to access the system bus when a main power supply is switched on, and for generating a signal for enabling the processor module group to access the system bus, although the common equipment protection circuit is not related to I2C buses (refer to, for example, patent reference 1).

[Patent Reference 1] JP, 62-150414, A

A problem with the related art I2C bus controlling method which is executed as mentioned above is that if above-mentioned SW-RESET occurs when the PHY unit is reading NVR data from the EEPROM (or MCU) mounted in the module, using the I2C bus or the like at the time of startup of the system, the EEPROM (or MCU) stops while it is in the middle of carrying out communications via the I2C bus and falls into an inoperative (i.e., hangup) state, and it becomes impossible to release this state.

While the disclosure of patent reference 1 is mainly related to the occurrence of HW-RESET, I2C buses differs from conventional buses in many ways, such as in that two or more pieces of equipment are connected to one another by using an SCL signal and an SDA signal so that they can exchange data with one another, a communications partner is specified using the SCL signal, and a multi-master function is provided. Therefore, patent reference 1 cannot be applied to I2C buses.

SUMMARY OF THE INVENTION

The present invention is made in order to solve the above-mentioned problems, and it is therefore an object of the present invention to provide an I2C bus controlling method of making it possible for a PHY unit to forcedly free an I2C interface circuit when an EEPROM or an MCU enters a hangup state in which it is inoperative because of the occurrence of SW-RESET.

In accordance with the present invention, there is provided an I2C bus controlling method of controlling an I2C bus which connects a PRY unit to either an EEPROM or an MCU, the method including the steps of: causing an I2C interface circuit of the PHY unit to output a serial clock signal and read NVR data from the EEPROM or MCU via the I2C bus in response to a HW-RESET signal from a host; causing the host to output a RESET command to the PHY unit so as to software-reset the PHY unit, thereby stopping the output of the serial clock signal from the I2C interface circuit; and causing the I2C interface circuit to forcedly output a serial clock signal so as to make the EEPROM or MCU recognize that interrupted I2C communications have been pseudo completed, and then free the I2C bus.

According to the present invention, since the EEPROM or MCU can realize that the output of the data which it stopped is completed, the EEPROM or MCU realizes that the interrupted communications have been pseudo completed, as if properly completed, and then frees the I2C bus. As a result, the present invention offers an advantage of being able to carry out communications properly irrespective of RESET.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
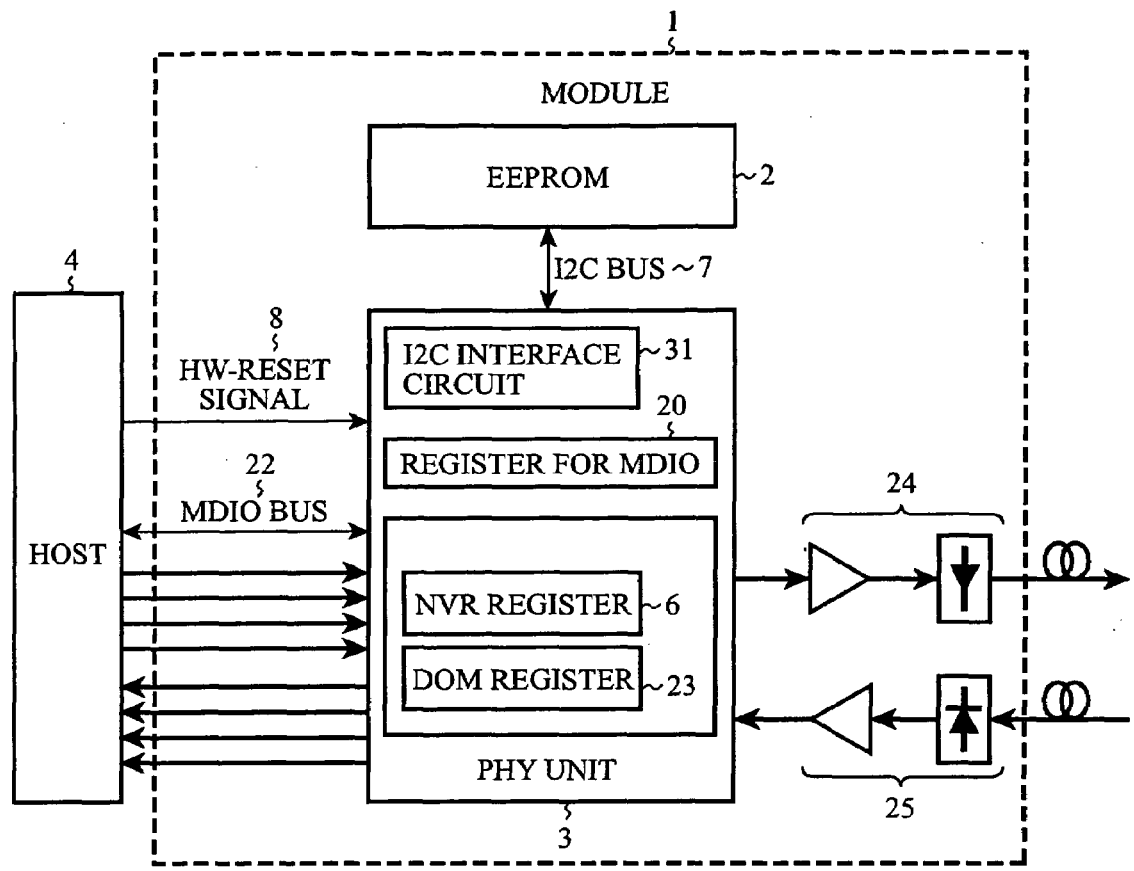
FIG. 1 is a circuit configuration diagram of a module in accordance with embodiment 1 of the present invention.

Embodiment 1 of the present invention will be now described hereafter. FIG. 1 is a circuit configuration diagram of a module in accordance with embodiment 1. The module 1 for optical communications is provided with a PHY unit 3 that carries out control of communications in a physical layer, an EEPROM 2 for holding data, a laser oscillating element 24 for transmission and a light receiving element 25 which are used for communications, and so on. The PHY unit 3 and EEPROM 2 are connected to each other via an I2C bus 7 which is disposed as a communications means, such as a local serial interface for transfer of NVR data. The PHY unit 3 has an I2C interface circuit 31 for controlling communications with the EEPROM 2 via the IC2 bus 7. A host 4 that carries out communications with the PHY unit 3 so as to control the PHY unit 3 is disposed outside the module 1, and is connected to the PHY unit 3 by way of an MDIO bus 22 which is a higher-layer bus. The PHY unit 3 is provided with a register 20 for MDIO, an NVR register 6, and a DOM register 23. An MCU can be provided instead of the EEPROM 2.

Figure 2:
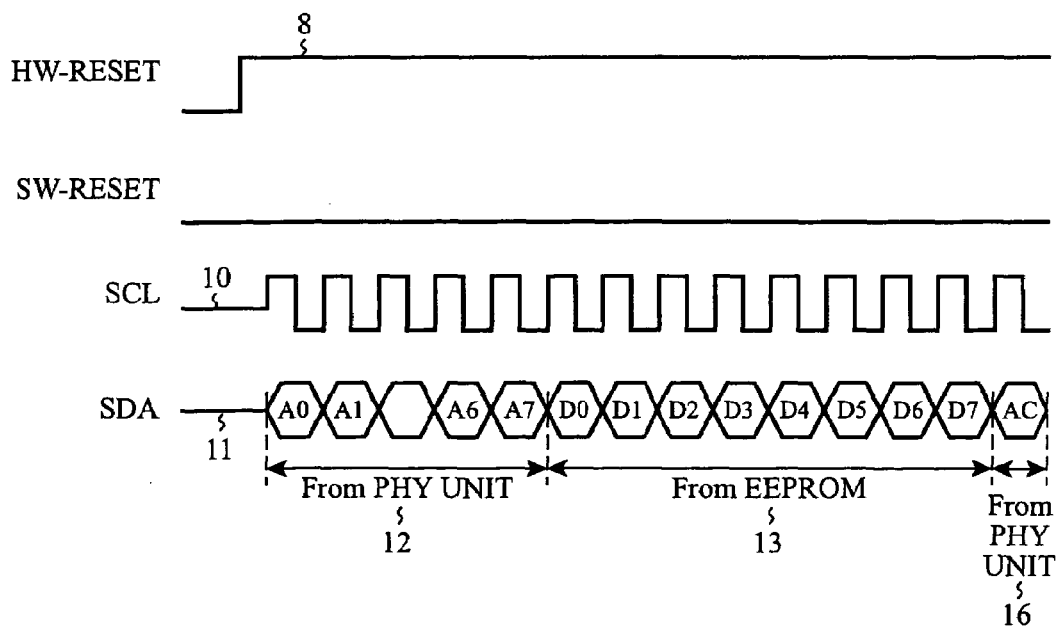
FIG. 2 is a timing chart of signals passing through an I2C bus (in a normal operation mode) of the module in accordance with embodiment 1 of the present invention.

Next, a normal operation mode of the module in accordance with this embodiment of the present invention will be explained with reference to FIGS. 1 and 2. FIG. 2 is a timing chart of signals passing through the I2C bus (in the normal operation mode) in accordance with embodiment 1. When starting up the module 1, the host 4 transmits an HW-RESET signal 8 to the PHY unit 3 of the module 1 so as to reset the PHY unit 3.

The PHY unit 3 reads NVR data required for initial setting from the EEPROM 2 via the I2C bus 7 after being started up. At this time, the I2C interface circuit 31 of the PHY unit 3 outputs an SCL signal 10 and an SDA signal 11 to the EEPROM 2 via the I2C bus 7. An address 12 is piggybacked onto the SDA signal 11.

In response to the SCL signal 10 and SDA signal 11, the EEPROM 2 piggybacks data 13 stored in a location specified by the address 12 onto the SDA signal 11 and then sends it back to the PHY unit 3.

When properly receiving the data 13 having a specified data length from the EEPROM 2, the PHY unit 3 piggybacks an Acknowledge signal 16 onto the SDA signal 11 and sends this SDA signal to the EEPROM 2. Then, the communications are properly completed.

Figure 3:
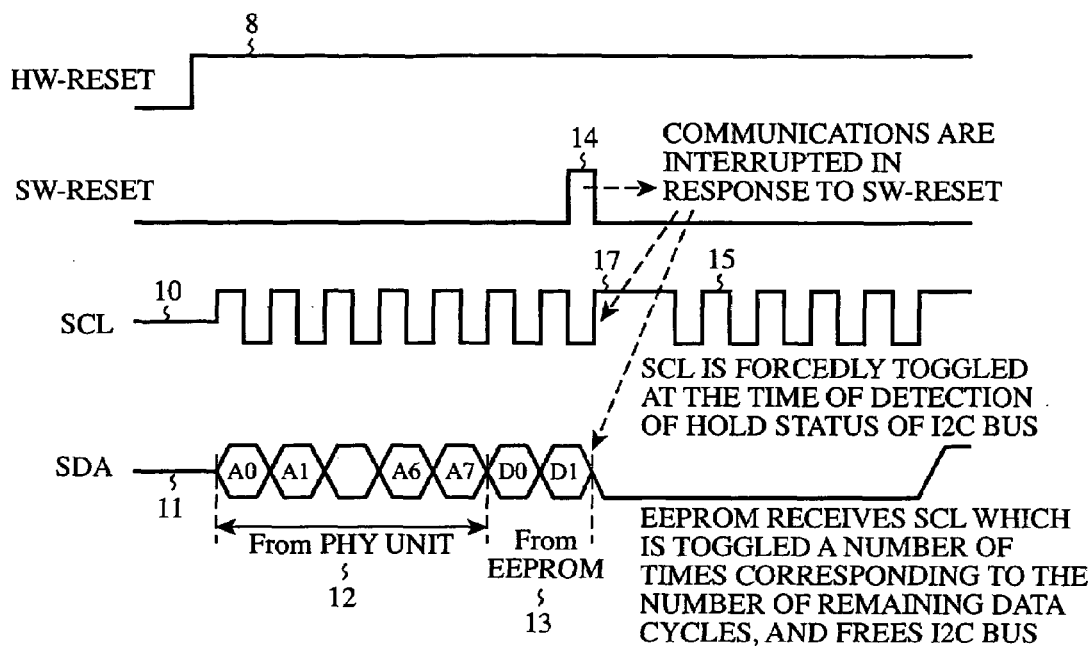
FIG. 3 is a timing chart of the signals passing through the I2C bus (in an SW-RESET mode) of the module in accordance with embodiment 1 of the present invention.

Next, the control operation of the module at the time of SW-RESET will be explained with reference to FIGS. 1 and 3. FIG. 3 is a timing chart of signals passing through the I2C bus (in an SW-RESET mode) in accordance with embodiment 1. When starting up the module 1, the host 4 transmits an HW-RESET signal 8 to the PHY unit 3 of the module 1 so as to reset the PHY unit 3.

The PHY unit 3 reads NVR data required for initial setting from the EEPROM 2 via the I2C bus 7 after being started up. At this time, the I2C interface circuit 31 of the PHY unit 3 outputs an SCL signal 10 and an SDA signal 11 to the EEPROM 2 via the I2C bus 7. An address 12 is piggybacked onto the SDA signal 11.

The host 4 outputs an SW-RESET command 14 so as to software-reset the PHY unit 3 after asserting the HW-RESET signal 8. As a result, since the PHY unit 3 is reset again, the I2C interface circuit 31 stops the output of the SCL signal 10 via the I2C bus. Since the SCL signal 10 is forcedly placed at a high state 17 according to the standards with which the I2C bus 7 complies, the SDA signal 11 becomes unchanged. When the SW-RESET command 14 is outputted while the EEPROM 2 outputs the SDA signal 11 onto which data 13 specified by the address 12 are piggybacked, the EEPROM 2 stops while being in a state in which it is using the I2C bus 7.

At this time, the I2C interface circuit 31 of the PHY unit 3 forcedly outputs an SCL signal 15 having a series of pulses whose number corresponds to the length of remaining data (i.e., D2 to D7 shown in FIG. 2) which the EEPROM 2 must originally have outputted to the PHY unit, if it did not stop, to the EEPROM 2 via the I2C bus 7 (that is, the I2C interface circuit 31 toggles the SCL signal a number of times corresponding to the data length). As a result, the EEPROM 2 determines that the data output which it stopped has been completed. In other words, since the EEPROM 2 recognizes that the interrupted communications via the I2C bus have been pseudo completed, as if properly completed, the EEPROM 2 frees the I2C bus 7.

As mentioned above, in the module in accordance with embodiment 1, the EEPROM (or MCU) 2 can recognize that interrupted communications via the I2C bus have been pseudo completed, as if properly completed, by determining that the output of data which it stopped has been completed in response to an SCL signal forcedly output by the PHY unit 3. Therefore, the EEPROM (or MCU) 2 can free the I2C bus 7. As a result, the present embodiment offers an advantage of being able to carry out communications properly irrespective of RESET.

Embodiment 2

Figure 4:
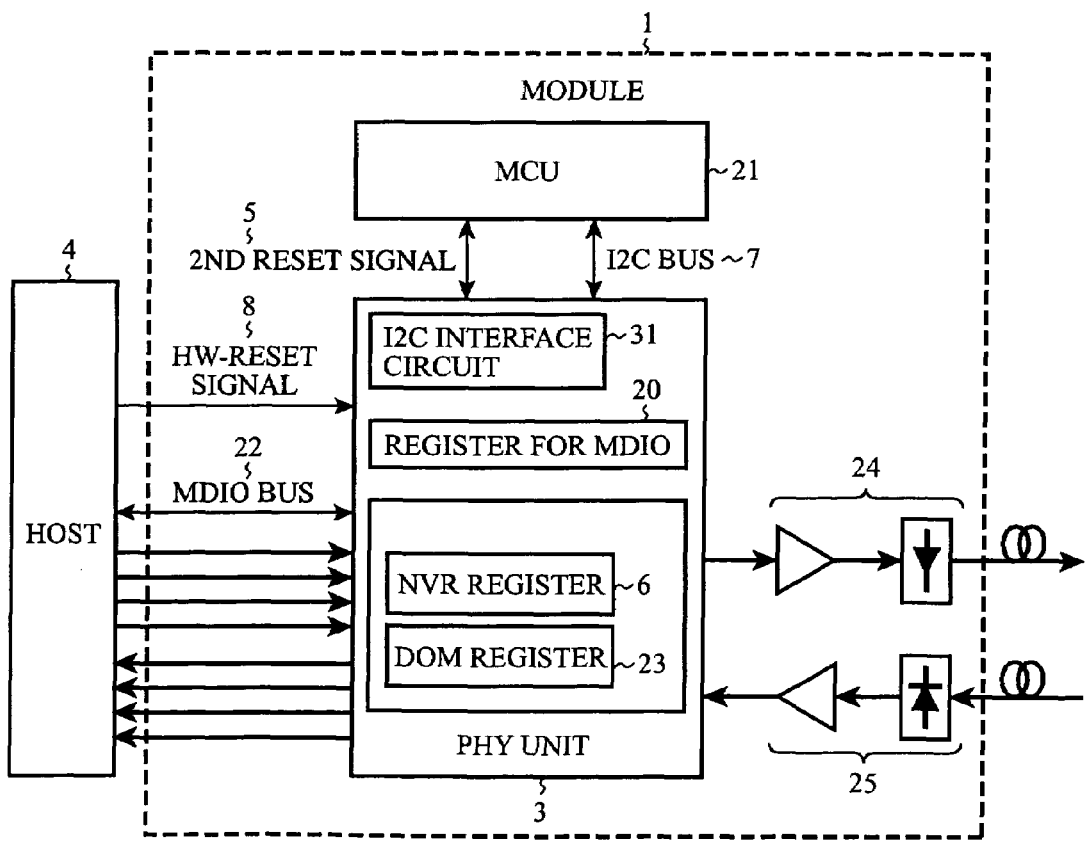
FIG. 4 is a circuit configuration diagram of a module in accordance with embodiment 2 of the present invention.

Embodiment 2 of the present invention will be now described hereafter. FIG. 4 is a circuit configuration diagram of a module in accordance with embodiment 2. The module 1 for optical communications is provided with a PHY unit 3 that carries out control of communications in a physical layer, an MCU 21 for holding data, a laser oscillating element 24 for transmission and a light receiving element 25 which are used for communications, and so on. The PHY unit 3 and MCU 21 are connected to each other via an I2C bus 7 which is disposed as a communications means, such as a local serial interface for NVR data transfer. The PHY unit 3 has an I2C interface circuit 31 for controlling communications with the MCU 21 via the IC2 bus 7. A host 4 that carries out communications with the PHY unit 3 so as to control the PHY unit 3 is disposed outside the module 1, and is connected to the PHY unit 3 by way of an MDIO bus 22 which is a higher-layer bus. The PHY unit 3 is provided with a register 20 for MDIO, an NVR register 6, and a DOM register 23.

Figure 5:
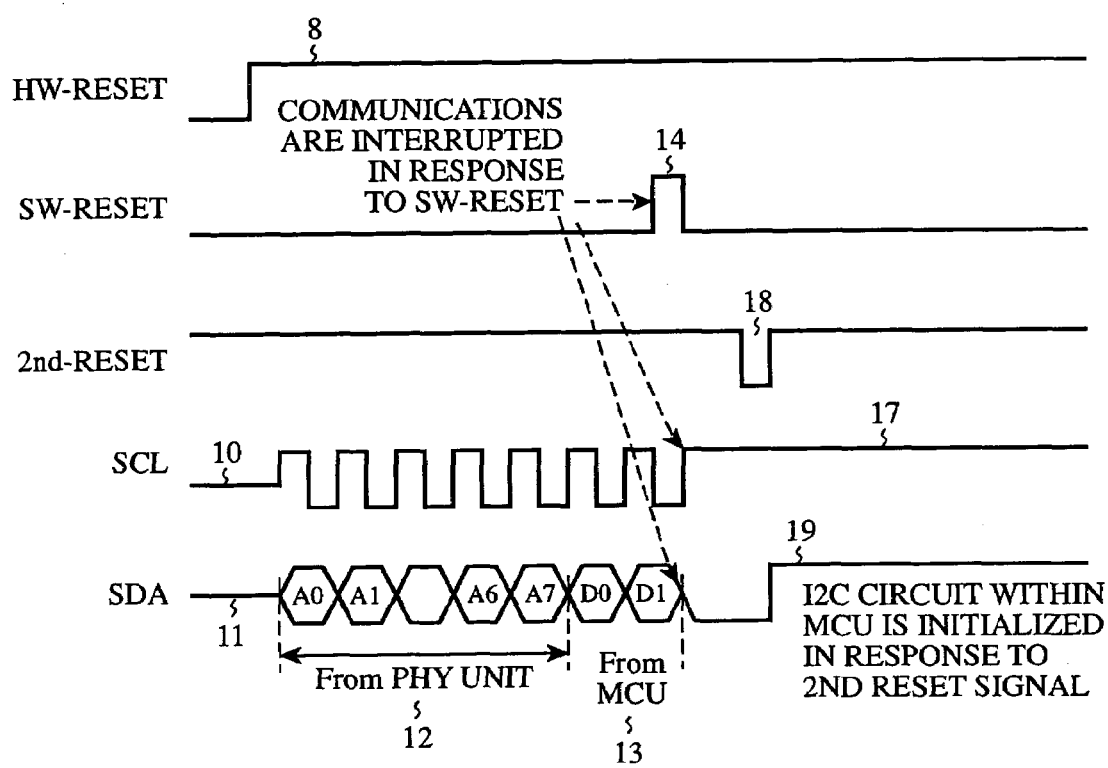
FIG. 5 is a timing chart of signals passing through an I2C bus (in an SW-RESET mode) of the module in accordance with embodiment 1 of the present invention.

Since the module 1 in a normal operation mode operates in the same way that that according to above-mentioned embodiment 1 does, only a control operation at the time of SW-RESET will be explained with reference to FIGS. 4 and 5. FIG. 5 is a timing chart of signals passing through the I2C bus (in an SW-RESET mode) in accordance with embodiment 2. When starting up the module 1, the host 4 transmits an HW-RESET signal 8 to the PHY unit 3 of the module 1 so as to reset the PHY unit 3.

The PHY unit 3 reads NVR data required for initial setting from the MCU 21 via the I2C bus 7 after being started up. At this time, the I2C interface circuit 31 of the PHY unit 3 outputs an SCL signal 10 and an SDA signal 11 to the MCU 21 via the I2C bus 7. An address 12 is piggybacked onto the SDA signal 11.

The host 4 outputs an SW-RESET command 14 so as to software-reset the PHY unit 3 after asserting the HW-RESET signal 8. As a result, since the PHY unit 3 is reset again, the I2C interface circuit 31 stops the output of the SCL signal 10 via the I2C bus. Since the SCL signal 10 is forcedly placed at a high state 17 according to the standards with which the I2C bus 7 complies, the SDA signal 11 becomes unchanged. When the SW-RESET command 14 is outputted while the MCU 21 outputs the SDA signal 11 onto which data 13 specified by the address 12 are piggybacked, the MCU 21 stops while being in a state in which it is using the I2C bus 7.

At this time, the PHY unit 3 performs second RESET on the MCU 21 in response to the SW-RESET command 14. In other words, the PHY unit 3 outputs a second RESET signal 18 to the MCU 21. The PHY unit 3 releases the interrupted communications via the I2C bus by resetting the MCU 21. As a result, the MCU 21 frees the I2C bus 7.

As mentioned above, the module in accordance with embodiment 2 frees the I2C bus 7 by outputting a second RESET signal 18 to the MCU 21 in response to an SW-RESET command 14 so as to reset the MCU 21 when the MCU 21 stops while being in a state in which it is using the I2C bus 7. As a result, the present embodiment offers an advantage of being able to carry out communications properly irrespective of RESET.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling an I2C bus which connects an IC for communication control to either a non-volatile external memory or an MCU, the method comprising:

causing an I2C interface circuit of the IC for communication control to output a serial clock signal and to read initial setting data from the non-volatile external memory or MCU via the I2C bus in response to a hardware RESET signal from a host;

causing the host to output a RESET command to the IC for communication control to software-reset the IC for communication control, thereby stopping the output of the serial clock signal from the I2C interface circuit; and causing the I2C interface circuit of the IC for communication control to forcedly output a serial clock signal including a series of pulses in a number corresponding to length of remaining data which the non-volatile external memory or MCU originally output to the IC, to make the non-volatile external memory or MCU recognize interrupted I2C communications as if properly completed, and free the I2C bus.

2. A method of controlling an I2C bus which connects an IC for communication control to an MCU, the method comprising:

causing an I2C interface circuit of the IC for communication control to output a serial clock signal and to read initial setting data from the MCU via the I2C bus in response to a hardware RESET signal from a host;

causing the host to output a RESET command to the IC for communication control to software-reset the IC for communication control, thereby stopping the output of the serial clock signal from the I2C interface circuit; and causing the IC for communication control to output a RESET signal which is synchronized with the software reset to the MCU to reset the MCU and cause the MCU to free the I2C bus.

* * * * *